UNITED STATES PATENT OFFICE.

MAURICE A. CARTER, OF GILBY, NORTH DAKOTA.

COMPOSITION OF MATTER.

1,348,479.     Specification of Letters Patent.     Patented Aug. 3, 1920.

No Drawing.     Application filed August 30, 1918. Serial No. 252,111.

*To all whom it may concern:*

Be it known that I, MAURICE A. CARTER, a citizen of the United States, residing at Gilby, in the county of Grand Forks and State of North Dakota, have invented a new and useful Composition of Matter, of which the following is a specification.

This invention relates to a composition of matter for use in either tempering or in case hardening steel, one of its objects being to provide a composition which can be prepared readily and which has been found to be thoroughly efficient in hardening plow shares, metal working tools, etc.

The invention consists of the following ingredients substantially in the proportions stated:

| | |
|---|---|
| Water | 35 gallons. |
| Salt (NaCl) | 25 pounds. |
| Ammonia water | 1 pint. |
| Yellow prussiate of potash | 3/4 pound. |
| Cyanid of potassium | 1/4 pound. |
| Pulverized rosin | 1 1/4 pounds. |
| Lampblack | 1 1/2 pounds. |
| Sweet milk | 1/2 pint. |
| Flaxseed oil | 1/2 gallon. |

In preparing the composition the water, salt and ammonia water are first mixed thoroughly to form the base of the composition. One and one half gallons of the said mixture are then combined with the other ingredients and boiled for about five minutes, the mixture being thoroughly stirred during the boiling process. The hot mixture is then poured into the first mixture or base of the composition and mixed and allowed to cool. The composition is then ready for use.

To harden iron it should be brought to a white heat and then dipped into the composition.

Tool steel should be brought to a dark red heat while soft steel should be brought to a bright red heat. After the metal has once been subjected to this treatment it can be reheated as often as desired and cooled in ordinary water without losing its hardness.

What is claimed is:—

A composition of matter for use in hardening metal, including sweet milk, flaxseed oil, lampblack, rosin, cyanid of potassium, yellow prussiate of potash, ammonia water, salt and water.

In testimony that I claim the foregoing as my own I have hereto affixed my signature in the presence of two witnesses.

MAURICE A. CARTER.

Witnesses:
F. L. McLEAN,
WM. J. SHIBLEY.